United States Patent Office 3,041,338
Patented June 26, 1962

3,041,338
5-HYDROXY SUBSTITUTED TETRAHYDRO-PYRIMIDINES
Kenneth G. Phillips, Chicago, Ill., assignor to Nalco Chemical Company, a corporation of Delaware
No Drawing. Filed July 21, 1958, Ser. No. 749,623
3 Claims. (Cl. 260—251)

This invention relates to 5-hydroxy substituted tetrahydropyrimidines having the general formula:

FORMULA I

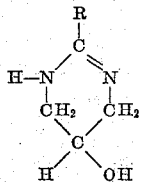

where R is an organic hydrocarbon group containing not more than 25 carbon atoms, preferably an aliphatic hydrocarbon group containing 1 to 25 carbon atoms. The invention also relates to the method of producing compounds of the type shown in the above formula by reacting certain monocarboxylic acids and/or their lower esters or amides with 1,3-diamino-2-propanol. More specifically, the invention is further concerned with the sulfuric acid esters of 5-hydroxy substituted tetrahydropyrimidines which have the general formula:

FORMULA II

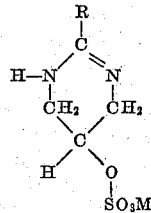

where R has the significance previously indicated, and M is a substituent which may be either hydrogen, alkali metal (e.g., Na, K, Li) or ammonium.

In accordance with the invention, it has been found that 5-hydroxy substituted tetrahydropyrimidines of the types previously described may be conveniently prepared by reacting an organic carboxylic acid with 1,3-diamino-2-propanol. The starting acids used to prepare these compounds may be selected from a wide variety of reagents. In its broadest aspect, the starting organic monocarboxylic acid which furnishes the substituent group R on the 2-carbon atom of the tetrahydropyrimidine ring should not contain more than 26 carbon atoms. Thus, for instance, such acids as acetic, abietic, benzoic, oleic, caproic, lignoceric, and the like may be used with good results being obtained in all cases. By having such a wide selection of acids available for preparing the 5-hydroxy substituted tetrahydropyrimides, it is possible to produce these compounds having aliphatic substituents attached to the 2-position which may be straight or branch chained, aromatic, alkyl-substituted aromatic, or cyclo-aliphatic, and saturated or unsaturated, which variations provide 5-hydroxy substituted tetrahydropyrimidines having a wide variety of chemical and physical properties.

While any acid of the types thus described may be used, the preferred compounds of the invention utilize in their preparation aliphatic monocarboxylic acids of from 2 to 26 carbon atoms in chain length; and, in a most preferred embodiment, they are prepared from saturated aliphatic monocarboxylic acids containing from 12 to 22 carbon atoms in chain length, which means that the group R contains 11 to 21 carbon atoms.

The general mechanism by which the 5-hydroxy substituted tetrahydropyrimidines are formed may be considered as a two-step reaction which involves amidification of the 1,3-diamino-2-propanol with the acid and with the subsequent ring closure by the reaction of the free primary amino group with the carbonyl group of the amide. Both steps involve a condensation reaction, which means that two moles of water for each mole of the acid and the amine are eliminated in the formation of the 5-hydroxy substituted tetrahydropyrimidines.

The reaction is usually conducted at elevated temperatures which should be at least 150° C., but may be as high as from 200° to 275–300° C. The reaction may be conducted at normal atmospheric pressure, although reduced pressure may also be used.

To insure adequate yields of the 5-hydroxy substituted tetrahydropyrimidine, it is advantageous to employ at least two moles of 1,3-diamino-2-propanol per mole of the starting acid. The greater the excess of the amine, the more complete will be the yield of the 5-hydroxy substituted tetrahydropyrimidine. In some instances where high yields are essential, as many as from 3 to 9 moles of the amine should be used, although under most circumstances good results are afforded when only two moles of the amine are used.

The reaction time is usually dependent upon the temperature and pressure at which the reaction is conducted, and as a general rule it may be stated that the higher the temperature employed the shorter will be the reaction time. Production of the compounds in accordance with the teachings of the invention has indicated that the minimum reaction time should be between one-half and one hour and may be for as long a period as eight or nine hours, particularly where the temperature ranges used are within the preferred ranges previously specified.

The limitations as to molar ratios of reactants, temperatures, and reaction times are presented as being illustrative of typical conditions that may be used. It is to be understood that broader ranges are contemplated as being within the scope of this invention. For instance, the molar ratio of the acid and the 1,3-diamino-2-propanol may be 1:1, the reaction time as long as several days, and the reaction temperature may be elevated to a point just below the decomposition temperature of the reactants and the particular product sought to be formed. It is preferable to carry out the reaction at temperatures below those at which substantial charring occurs.

While the free monocarboxylic acid may be used to prepare the 5-hydroxy substituted tetrahydropyrimidines, equally good results are afforded when either the lower alkyl ester or amides of such acids, or mixtures thereof, are used. The term "lower esters" refers to the esters formed from such lower alcohols as methanol, ethanol, butanol, and the like. These alcohols should not exceed 6 carbon atoms in chain length. Similarly, the lower amides are obtained by reacting amines such as methyl amine, ethylamine, propylamine, or other amines containing not more than six carbon atoms with the monocarboxylic acids. In some cases, the starting acid will be derived from mixed acids such as occur in the vegetable oils and fats such as coconut oil, beef tallow, marine oils, castor oil, cotton seed oil, and the like. When such mixed, naturally-occurring acids are used, they may be reacted either as the free acid or as their naturally-occurring glycerides.

A preferred and convenient method for reacting the various carboxylic acids with the 1,3-diamino-2-propanol consists in conducting a reaction in the presence of a water-insoluble organic liquid which will form an azeotrope with water and is substantially inert chemically to the reactants and products. By using such a reaction media, it is possible to remove the water of condensation formed as an azeotropic mixture which tends to more readily drive the reaction to completion. The use of this azeotropic method has the additional advantage of allowing the reaction to be conducted at a somewhat lower temperature. Typical organic insoluble nonreactive, azeotropic liquids are such compounds as benzene, xylene, and toluene.

When excesses of the amine are used, they should be removed from the product by distilling under reduced pressure to finish the reaction.

The 1,3-diamino-2-propanol which is used to synthesize the several 5-hydroxy substituted tetrahydropyrimidines is a well-known material and may be prepared in accordance with the teachings of Bottoms, U.S. Patents 1,985,885 and 2,065,113, the disclosures of which are incorporated herein by reference.

In order to demonstrate a typical preparation of 5-hydroxy substituted tetrahydropyrimidine, the following preparation of 1-heptadecyl-5-hydroxy tetrahydropyrimidine from stearic acid and 1,3-diamino-2-propanol is given by way of illustration in the following example:

EXAMPLE I

*Reaction Between 1,3-Diamino-2-Propanol and Stearic Acid*

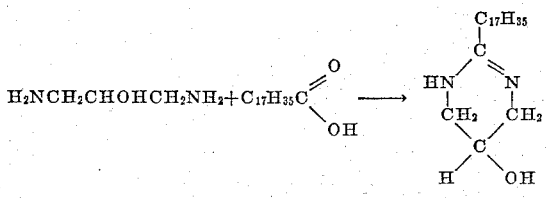

A mixture of 1,3-diamino-2-propanol (108 g.–2 moles) and stearic acid (170 g.–1 mole) was refluxed with stirring in 200 ml. of xylene. The temperature was maintained at 140° C. for 4 hours, during which time 9 ml. of water came off. The temperature was raised slowly over three hours to 250° C. and more water (xylene insoluble) was collected. The excess xylene and diamine were removed by vacuum distillation, and the residue distilled under reduced pressure. The product had a boiling point of 240°–260° C./2–3 mm.

The 5-hydroxy substituted tetrahydropyrimidines have many useful and valuable applications, the most notable of which are their ability to react with sulfonating agents such as chlorosulfonic acid or $SO_3$ to form sulfuric acid esters. These sulfate esters, particularly when the substituent in the 2-position is a higher aliphatic group, are extremely useful ampholytic wetting agents and emulsifiers. The sulfonation of the 5-hydroxy substituted tetrahydropyrimidines may be conveniently conducted by using the procedure set forth in Example II below:

EXAMPLE II

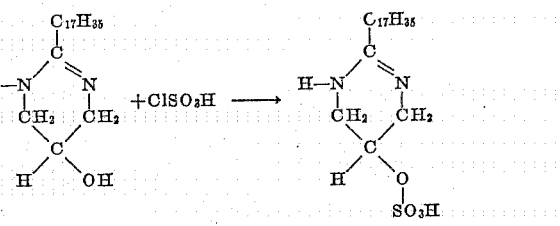

Twenty-five grams of the product of Example I was dissolved in chloroform (100 ml.) stirred, and cooled to 10° C. Chlorosulfonic acid (5.1 ml.) was dissolved in chloroform (15 ml.) and was added over a ten-minute period at 20° C. The cooling bath was removed and stirred at room temperature for one hour.

The reaction mixture was poured into methanol, and the slurry filtered to yield a white powder. The final product had a melting point of 235–240° C.

The free sulfonic acid readily may be converted into its water-soluble salt form by treating sulfated 5-hydroxy substituted tetrahydropyrimidines with appropriate alkalies such as, for instance, the hydroxides of sodium, potassium, lithium, cesium, rubidium, and ammonia. Salts of this class readily foam in water and, in most instances, are extremely soluble in both soft and hard waters.

One of the most useful and interesting applications of the 5-hydroxy substituted tetrahydropyrimidines resides in the use of these products to produce carboxylic acid esters by reacting an acid with the hydroxyl group occurring at the 5-position of the ring. Thus, for instance, the 1-heptadecyl-5-hydroxy tetrahydropyrimidine stearate is a valuable textile treating compound which can produce a better hand or a softened fabric when used in relatively small amounts.

In addition to having a reactive hydroxy group in the 5-position, the ring containing nitrogen atoms may enter into further reaction with such chemicals as alkylene oxides (e.g., ethylene oxide, 1,2-propylene oxide, butylene oxide), alkyl halides, and carboxylic or sulfonic acids to produce such derivatives as alcohols, salts, or amides, tertiary amine salts, and quaternary ammonium salts, all of which have value for such applications as corrosion inhibitors, wetting agents, emulsifiers, and lubricant additives.

One of the most interesting features of 5-hydroxy substituted tetrahydropyrimidines is that only one of the nitrogen atoms in the ring structure is basic. While reaction with alkyl halides may be conducted with relative ease, it is to be understood that it is not definitely known which particular nitrogen atoms possess the basic characteristics. Such reaction products, whether occurring on the one or three nitrogen atom, would of course be equivalents.

In order to illustrate typical 5-hydroxy substituted tetrahydropyrimidines and their sulfate esters and salts of such esters, the following typical compounds are listed by way of illustration:

2-methyl-5-hydroxy tetrahydropyrimidine
2-phenyl-5-hydroxy tetrahydropyrimidine
2-naphthyl-5-hydroxy tetrahydropyrimidine
2-heptadecenyl-5-hydroxy tetrahydropyrimidine
2-coco-5-hydroxy tetrahydropyrimidine [1]
2-abietyl-5-hydroxy tetrahydropyrimidine [2]
2-isobutyl-5-hydroxy tetrahydropyrimidine [3]
2-heptadecenyl-5-hydroxy tetrahydropyrimidine-sodium sulfate
2-pentadecyl-5-hydroxy tetrahydropyrimidine-ammonium sulfate

[1] Derived from coconut oil fatty acids.
[2] Derived from hydrogenated tallow fatty acids.
[3] Derived from rosin fatty acids.

Having thus described the invention in all its aspects, it is claimed as follows:

1. A tetrahydropyrimidine of the formula:

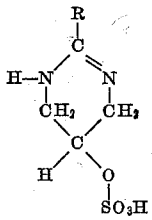

where R is selected from the group consisting of saturated and ethylenic aliphatic hydrocarbon groups of from 1 to 25 carbon atoms in chain length.

2. A tetrahydropyrimidine of the formula:

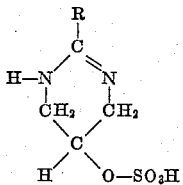

where R is a saturated aliphatic hydrocarbon group of from 11 to 21 carbon atoms in chain length.

3. A tetrahydropyrimidine of the formula:

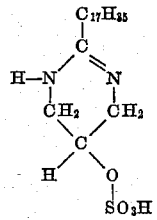

References Cited in the file of this patent

UNITED STATES PATENTS

| | | |
|---|---|---|
| 2,211,001 | Chwala | Aug. 3, 1941 |
| 2,704,757 | Dornfeld | Mar. 22, 1955 |

FOREIGN PATENTS

| | | |
|---|---|---|
| 756,189 | Great Britain | Aug. 29, 1952 |
| 836,873 | France | Jan. 27, 1939 |
| 694,046 | Germany | July 24, 1940 |
| 700,371 | Germany | Dec. 18, 1940 |

OTHER REFERENCES

Bartell: Ind. and Eng. Chem., vol. 33 (1941), pp. 737–40.

Caryl: Ind. and Eng. Chem., vol. 33 (1941), p. 731.

Snell: Ind. and Eng. Chem., vol. 35 (1943), pp. 107–17 (page 107 relied on).

Karrer: Organic Chemistry (second English edition, 1946), pp. 65–67.

UNITED STATES PATENT OFFICE

CERTIFICATE OF CORRECTION

Patent No. 3,041,338                                                June 26, 1962

Kenneth G. Phillips

It is hereby certified that error appears in the above numbered patent requiring correction and that the said Letters Patent should read as corrected below.

Column 6, line 14, for "Aug. 3, 1941" read -- Aug. 13, 1940 --; same column, line 18, for "Aug. 29, 1952" read -- Aug. 29, 1956 --.

Signed and sealed this 30th day of October 1962.

(SEAL)
Attest:

ERNEST W. SWIDER
Attesting Officer

DAVID L. LADD
Commissioner of Patents